(12) United States Patent
Kim et al.

(10) Patent No.: US 9,257,686 B2
(45) Date of Patent: Feb. 9, 2016

(54) SECONDARY BATTERY

(75) Inventors: Sungbae Kim, Yongin-si (KR);
Sangwon Byun, Yongin-si (KR);
Yongsam Kim, Yongin-si (KR)

(73) Assignees: SAMSUNC SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 536 days.

(21) Appl. No.: 12/923,639

(22) Filed: Sep. 30, 2010

(65) Prior Publication Data

US 2011/0189535 A1   Aug. 4, 2011

(30) Foreign Application Priority Data

Feb. 2, 2010   (KR) .................. 10-2010-0009490

(51) Int. Cl.
*H01M 2/06*   (2006.01)
(52) U.S. Cl.
CPC ...................... *H01M 2/06* (2013.01)
(58) Field of Classification Search
USPC ......................................................... 429/181
See application file for complete search history.

(56) References Cited

U.S. PATENT DOCUMENTS

2006/0115727 A1* 6/2006 Kim et al. .................. 429/181

FOREIGN PATENT DOCUMENTS

| JP | 07335278 A | * | 12/1995 |
| JP | 2000-113865 A | | 4/2000 |
| JP | 2000113865 A | * | 4/2000 |
| JP | 2007-179793 A | | 7/2007 |
| KR | 10 2006-0060801 A | | 6/2006 |
| KR | 10 2007-0014657 A | | 2/2007 |
| KR | 20070014657 A | * | 2/2007 |

OTHER PUBLICATIONS

Korean Office Action in KR 10 2010-0009490, dated Jun. 24, 2011 (Kim, et al.).
Korean Notice of Allowance in KR 10-2010-0009490, dated Feb. 2, 2012 (Kim, et al.).

* cited by examiner

*Primary Examiner* — Ula C Ruddock
*Assistant Examiner* — Daniel Gatewood
(74) *Attorney, Agent, or Firm* — Lee & Morse, P.C.

(57) ABSTRACT

A secondary battery including a case; an electrode assembly and electrolyte accommodated in the case; an electrode terminal electrically connected to the electrode assembly, the electrode terminal including a terminal body; a cap plate sealing the case, the terminal body penetrating through the cap plate; and a seal gasket surrounding a lower portion of the terminal body, wherein the electrode terminal includes a laterally protruding part on a portion of the terminal body protruding outside the case, and the seal gasket is in close contact with a lower end of the protruding part.

14 Claims, 6 Drawing Sheets

SECONDARY BATTERY

BACKGROUND

1. Field

Embodiments relate to a secondary battery.

2. Description of the Related Art

Unlike a primary battery which is not rechargeable, a secondary (rechargeable) battery is capable of being charged and discharged. A low-capacity secondary battery composed of a single battery cell packaged in a pack structure may be used as a power source for various small portable electronic devices, e.g., cellular phones and camcorders. A high-capacity secondary battery in which a plurality of battery cells are connected to each other in a pack structure may be used as a power source for driving a motor of a hybrid electric vehicle (HEV).

Secondary batteries may be manufactured in various shapes. Generally, secondary batteries may be classified as a cylindrical shape battery or a prismatic shape battery. The secondary battery may be formed such that an electrode assembly formed by disposing a separator as an insulation member between positive and negative electrode plates and an electrolyte are accommodated in a case, and a cap assembly having electrode terminals is provided in the case. The electrode terminals may extend outside through the cap assembly.

SUMMARY

Embodiments are directed to a secondary battery, which substantially overcome one or more of the problems due to the limitations and disadvantages of the related art.

It is a feature of an embodiment to provide a secondary battery that eliminates a gap between each of the electrode terminals and the cap plate and enhances the sealing efficiency therebetween, thereby preventing electrolyte from leaking and external moisture from infiltrating into a battery case.

At least one of the above and other features and advantages may be realized by providing a secondary battery including a case; an electrode assembly and electrolyte accommodated in the case; an electrode terminal electrically connected to the electrode assembly, the electrode terminal including a terminal body; a cap plate sealing the case, the terminal body penetrating through the cap plate; and a seal gasket surrounding a lower portion of the terminal body, wherein the electrode terminal includes a laterally protruding part on a portion of the terminal body protruding outside the case, and the seal gasket is in close contact with a lower end of the protruding part.

The seal gasket may have a hollow tube shaped body, the hollow tube shaped body surrounding a lower portion of the terminal body of the electrode terminal.

The seal gasket may include an inwardly formed chamfer part at an upper end thereof.

The seal gasket may include a body surrounding the lower portion of the terminal body of the electrode terminal, and a flange extending outwardly in a horizontal direction from a lower end of the body, the flange being in close contact with a bottom surface of the cap plate.

The flange may include at least one protrusion on a top surface thereof, the at least one protrusion being in close contact with the bottom surface of the cap plate.

The secondary battery may further include an upper insulation member in close contact with a top surface of the cap plate and an upper side surface of the seal gasket.

The upper insulation member may include an adhering part on a surface thereof, the adhering part surrounding the protruding part of the electrode terminal.

The cap plate may include a recess therein, the recess being engaged with the upper insulation member.

The secondary battery may further include a lower insulation member, the lower insulation member being in close contact with a lower side surface of the seal gasket and a bottom surface of the cap plate.

The cap plate may include a recess therein, the recess being engaged with the lower insulation member.

The electrode terminal may further include a terminal extension part riveted to a bottom portion of the terminal body and securely fixed thereto, the terminal extension part being in close contact with a bottom surface of the lower insulation member, and a terminal welding part welded to an electrode non-coating portion of the electrode assembly.

At least one of the above and other features and advantages may also be realized by providing a secondary battery including a case; an electrode assembly and electrolyte accommodated in the case; an electrode terminal electrically connected to the electrode assembly, the electrode terminal including a terminal body; a cap plate sealing the case, the terminal body penetrating through the cap plate; a seal gasket, the seal gasket including a body surrounding a lower portion of the terminal body and a flange extending outwardly in a horizontal direction from a lower end of the body, the flange being in close contact with a bottom surface of the cap plate; and a lower insulation member in close contact with a lower side surface of the seal gasket, the lower insulation member being in close contact with the bottom surface of the cap plate, wherein the electrode terminal includes a laterally protruding part on a portion of the terminal body protruding outside the case, and the seal gasket is in close contact with a lower end of the protruding part.

The lower insulation member may include a sill at a portion thereof in close contact with a side surface of the flange of the seal gasket, and the flange of the seal gasket may have a seating part extending from a side surface thereof, the seating part being securely placed in the sill.

The seal gasket may include an inwardly formed chamfer part at an upper end thereof.

At least one protrusion in close contact with the bottom surface of the cap plate may be disposed on a top surface of the flange.

The secondary battery may further include an upper insulation member in close contact with a top surface of the cap plate and an upper side surface of the seal gasket.

The secondary battery may further include an adhering part on a surface of the upper insulation member, the adhering part surrounding the protruding part of the electrode terminal.

The cap plate may include a recess therein, the recess being engaged with the upper insulation member.

The cap plate may include a recess therein, the recess being engaged with the lower insulation member.

The electrode terminal may further include a terminal extension part riveted to a bottom portion of the terminal body and securely fixed thereto, the terminal extension part being in close contact with a bottom surface of the lower insulation member; and a terminal welding part welded to an electrode non-coating portion of the electrode assembly.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0009490, filed on Feb. 2, 2010 in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1:
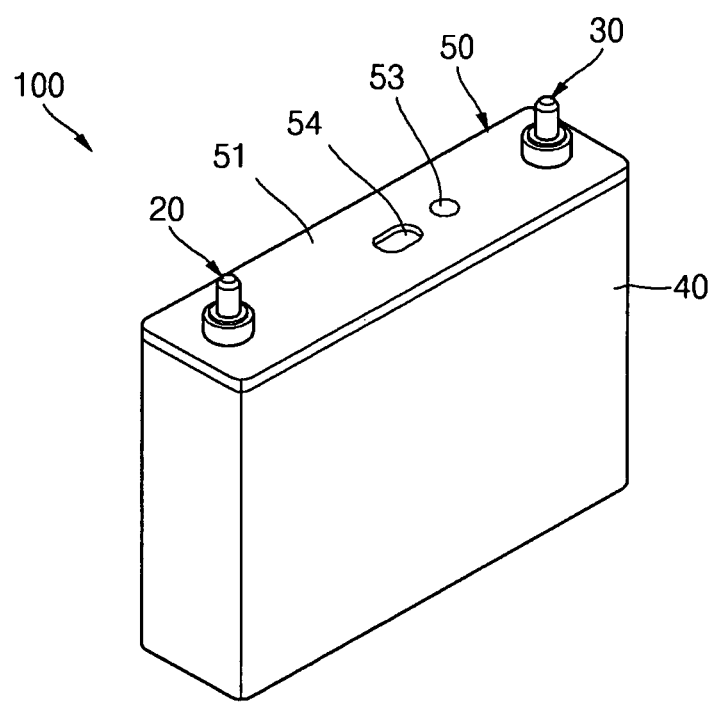
FIG. 1 illustrates a perspective view of a secondary battery according to an embodiment.
Figure 2:
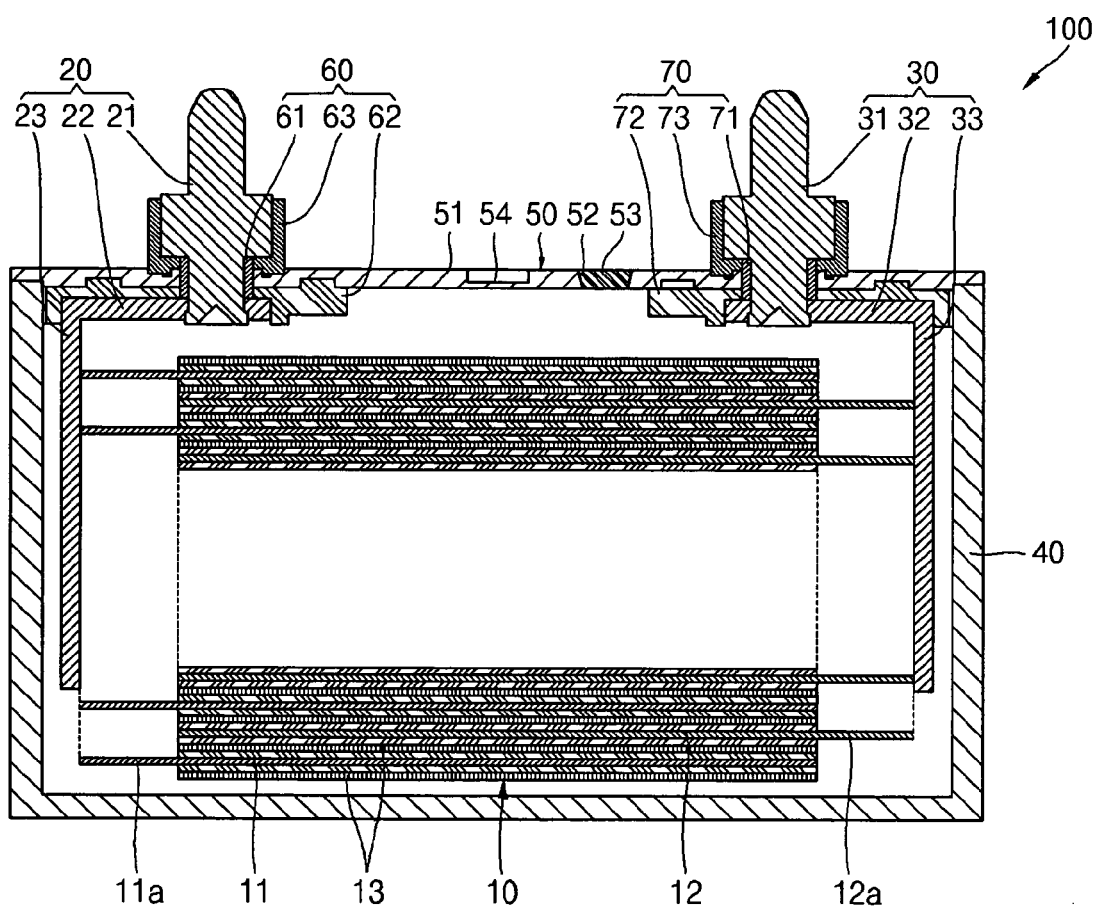
FIG. 2 illustrates a sectional view of the secondary battery of FIG. 1.
Figure 3:
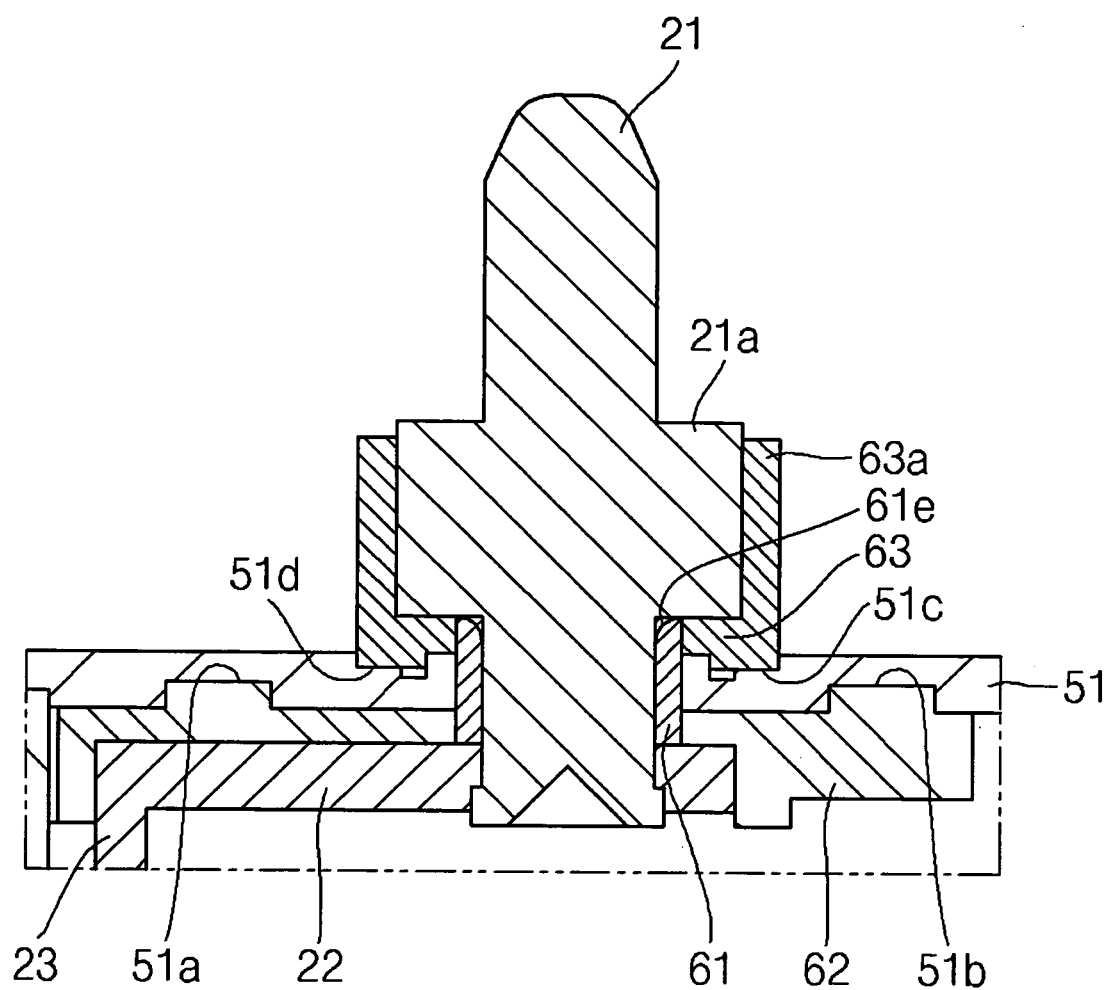
FIG. 3 is illustrates an enlarged cross-sectional view of FIG. 2.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout FIG. 1 illustrates a perspective view of a secondary battery according to an embodiment. FIG. 2 illustrates a sectional view of the secondary battery of FIG. 1. FIG. 3 illustrates an enlarged cross-sectional view of FIG. 2.

Referring to FIGS. 1 through 3, the secondary battery 100 according to the present embodiment may include an electrode assembly 10, a first electrode terminal 20, a second electrode terminal 30, a case 40, and a cap assembly 50.

The electrode assembly 10 may be formed by winding or stacking a laminate of a first electrode plate 11, a separator 13, and a second electrode plate 12, each formed of a thin film or layer. Here, the first electrode plate 11 may function as a negative electrode and the second electrode plate 12 may function as a positive electrode.

The first electrode plate 11 may be formed by coating a first electrode active material, e.g., a transition metal oxide, on a first electrode collector formed of a metal foil made of aluminum. The first electrode plate 11 may include a first electrode non-coating portion 11a that is not coated with a first active material. The first electrode non-coating portion 11a may be a passage for current flow between the first electrode plate 11 and the first electrode terminal 20. Materials of the first electrode plate 11 are not limited to the exemplary material.

The second electrode plate 12 may be formed by coating a second electrode active material, e.g., graphite or carbon, on a second electrode collector formed of a metal foil made of nickel or copper. The second electrode plate 12 may include a second electrode non-coating portion 12a that is not coated with a second active material. The second electrode non-coating portion 12a may be a passage for current flow between the second electrode plate 12 and the second electrode terminal 30. Materials of the second electrode plate 12 are not limited to the exemplary material.

The first electrode plate 11 and the second electrode plate 12 may be arranged after changing polarities thereof.

The separator 13 may be positioned between the positive electrode plate 11 and the negative electrode plate 12 and may prevent an electrical short-circuit therebetween to allow for movement of lithium ions. The separator 13 may be made of, e.g., polyethylene, polypropylene, and a composite film of polyethylene and polypropylene, but is not limited thereto.

The first electrode terminal 20 and the second electrode terminal 30 may be coupled to both ends of the electrode assembly 10 to which the first electrode plate 11 and the second electrode plate 12 are electrically connected, respectively.

The electrode assembly 10 may be accommodated in the case 40 with electrolyte (not shown). The electrolyte may include an organic solvent, e.g., ethylene carbonate (EC), propylene carbonate (PC), diethyl carbon-ate (DEC), ethyl methyl carbonate (EMC), and/or dimethyl carbonate (DMC), and a lithium salt, e.g., $LiPF_6$, or $LiBF_4$. The electrolyte may exist in a liquid, solid, or gel phase.

If the electrolyte infiltrates a gap between the first electrode terminal 20 and the cap assembly 50 or a gap between the second electrode terminal 30 and the cap assembly 50, it may cause an electrical short-circuit between the first electrode terminal 20 and the cap assembly 50.

The first electrode terminal 20 may be made of a conductive material, e.g., aluminum (Al), and may be electrically connected to the first electrode plate 11 by being welded to the first electrode non-coating portion 11a protruding toward one end of the cap assembly 50.

The first electrode terminal 20 may include a first terminal body 21, a first terminal extension part 22, and a first terminal welding part 23.

The first terminal body 21 may penetrate through the cap assembly 50 and a lower portion thereof may be riveted to be fixed to the first terminal extension part 22.

The first terminal body 21 may include a laterally protruding part 21a on a portion thereof protruding outside cap assembly 50. The protruding part 21a may be disposed at a lower end of the portion of the terminal body 21 outside of the cap assembly 50.

The first terminal extension part 22 may extend horizontally from a bottom end of the first terminal body 21 to come into close contact with a bottom surface of a first lower insulation member 62.

The first terminal welding part 23 may extend vertically from the first terminal extension part 22 to be closely adhered to the first electrode non-coating portion 11a of the electrode assembly 10. In other words, the first terminal welding part 23 may be welded to the first electrode non-coating portion 11a.

The second electrode terminal 30 may be made of a conductive material, e.g., nickel (Ni), and may be electrically connected to the second electrode plate 12 by coming into contact with the second electrode non-coating portion 12a protruding toward another end of the electrode assembly 10.

The second electrode terminal 30 may include a second terminal body 31 having a protruding part, a second terminal extension part 32, and a second terminal welding part 33.

The second terminal body 31, the second terminal extension part 32, and the second terminal welding part 33 of the second electrode terminal 30 are substantially the same as first terminal body 21, the first terminal extension part 22, and the first terminal welding part 23 of the first electrode terminal 20 in view of configuration and functions, and repeated explanation thereof will be omitted.

The case 40 may be made of a conductive metal, e.g., aluminum (Al), Al alloy, or Ni-plated steel, and may be formed in a substantially cuboid shape having an opening in which the electrode assembly 10, the first electrode terminal 20, the second electrode terminal 30, and electrolyte (not shown) may be accommodated. Although FIGS. 1 and 2 illustrate a state in which the case 40 and the cap assembly 50 are coupled to each other without the opening, a perimeter of the cap assembly 50 may be a substantially opened portion. An internal surface of the case 40 may be subjected to insulation treatment so that the case 40 is electrically insulated from the electrode assembly 10, the first electrode terminal 20, and the second electrode terminal 30.

The cap assembly 50 may be coupled to the case 40. The cap assembly 50 may include a cap plate 51. The cap plate 51 may seal an opening of the case 40. The cap plate 51 may be made of a same material as the case 40. The cap plate 51 may have a same polarity as the case 40. In addition, the cap plate 51 may include a plug 53 that closes an electrolyte injection hole 52 and a safety valve 54 that has a relatively small thickness.

The cap assembly 50 may further include a first sealing part 60 and a second sealing part 70.

The first sealing part 60 may include a first seal gasket 61 surrounding a lower portion of the first terminal body 21, the first lower insulation member 62, and a first upper insulation member 63.

The second sealing part 70 may include a second seal gasket 71 surrounding a lower portion of the second terminal body 31, a second lower insulation member 72, and a second upper insulation member 73.

Since the first sealing part 60 and the second sealing part 70 have the same configurations, the following description will be focused on the configuration of the first sealing part 60. In the following description, the first electrode terminal 20, the first terminal body 21, the first terminal extension part 22, the first terminal welding part 23, the first seal gasket 61, the first lower insulation member 62, the first upper insulation member 63, and the first terminal plate 64 will be briefly referred to as the electrode terminal 20, the terminal body 21, the terminal extension part 22, the terminal welding part 23, the seal gasket 61, the lower insulation member 62, the upper insulation member 63, and the terminal plate 64, respectively.

As illustrated in FIG. 3, the seal gasket 61 may surround a lower portion of the terminal body 21 of the electrode terminal 20, thereby preventing electrolyte from infiltrating into a gap between the electrode terminal 20 and the cap plate 51. In particular, an upper end of the seal gasket 61 may be brought into close contact with a lower end of the protruding part 21a of the terminal body 21. Accordingly, the seal gasket 61 may prevent electrolyte from infiltrating into the gap between the electrode terminal 20 and the cap plate 51, thereby preventing unnecessary and undesirable electrical short-circuits due to a reduction in the breakdown voltage between the electrode terminal 20 and the cap plate 51. In addition, the seal gasket 61 may prevent external moisture from infiltrating into the case 40 through the cap plate 51.

The seal gasket 61 may be made of an insulating material. In particular, any suitable insulating material may be used as long as it is generally accepted in the related art.

The seal gasket 61 may have the shape of a hollow tube to surround the lower portion of the terminal body 21. The seal gasket 61 may surround a lower perimeter of the terminal body 21 in a substantially tubular shape, thereby preventing the electrolyte from leaking out of the case 40 through a gap between the terminal body 21 and the cap plate 51.

In order to facilitate insertion of the seal gasket 61 into the lower portion of the terminal body 21, a chamfer part 61e may be inwardly formed at an upper end of the seal gasket 61.

A portion of the lower insulation member 62 may be in close contact with a lower side surface of the seal gasket 61. In addition, another portion of the lower insulation member 62 may be in close contact with a bottom surface of the cap plate 51. In such a configuration, the side surface of the lower portion of the seal gasket 61 may be brought into close contact with the portion of the lower insulation member 62, thereby further enhancing sealing efficiency of the battery.

The terminal extension part 22 of the terminal body 21 may come into close contact with a bottom surface of the lower insulation member 62. The lower insulation member 62 may be coupled to the bottom surface of the cap plate 51. The cap plate 51 may include recesses 51a and 51b having a predetermined depth to prevent the lower insulation member 62 from rotating. In addition, protrusions having a predetermined thickness may be formed on the top surface of the lower insulation member 62 and the protrusions may be inserted into the recesses 51a and 51b.

The upper insulation member 63 may be coupled to the terminal body 21 of the electrode terminal 20 and may come into close contact with a top surface of the cap plate 51. If the upper insulation member 63 comes into close contact with an upper side surface of the seal gasket 61, the electrolyte may be prevented from infiltrating into the gap between the cap plate 51 and the electrode terminal 20, thereby preventing unnecessary electrical short-circuits due to a reduction in the breakdown voltage between the electrode terminal 20 and the cap plate 51.

An adhering part 63a surrounding the protruding part 21a of the terminal body 21 may be provided on a surface of the upper insulation member 63. The adhering part 63a of the upper insulation member 63 may prevent moisture from infiltrating into or beneath the terminal body 21. The cap plate 51 may include recesses 51c and 51d therein having a predetermined depth to prevent the upper insulation member 63 from rotating. In addition, protrusions having a predetermined thickness on the bottom surface of the upper insulation member 63 may correspond to and engaged with the recesses 51c and 51d.

As described above, the bottom portion of the terminal body 21 of the electrode terminal 20 may be riveted to be securely fixed to the terminal extension part 22.

In the secondary battery 100 according to the present embodiment, riveting may be performed at the bottom portion of the terminal body 21 of the electrode terminal 20. Thus, after assembling components of the secondary battery, excluding the case 40, the terminal body 21 may be riveted and finally assembled with the case 40, thereby facilitating manufacture of the secondary battery.

As described above, in the secondary battery 100 according to the present embodiment, the protruding part 21a may be formed at the terminal body 21 of the electrode terminal 20; and the protruding part 21a of the terminal body 21 may be surrounded by the adhering part 63a of the upper insulation member 63. In addition, the seal gasket 61 may surround the lower portion of the terminal body 21; and the upper end of the seal gasket 61 may come into contact with the lower end of the protruding part 21a of the terminal body 21, by which a gap between the cap plate 51 and the electrode terminal 20 is eliminated, thereby preventing the electrolyte and moisture from leaking out of or infiltrating into the case 40.

Figure 4:
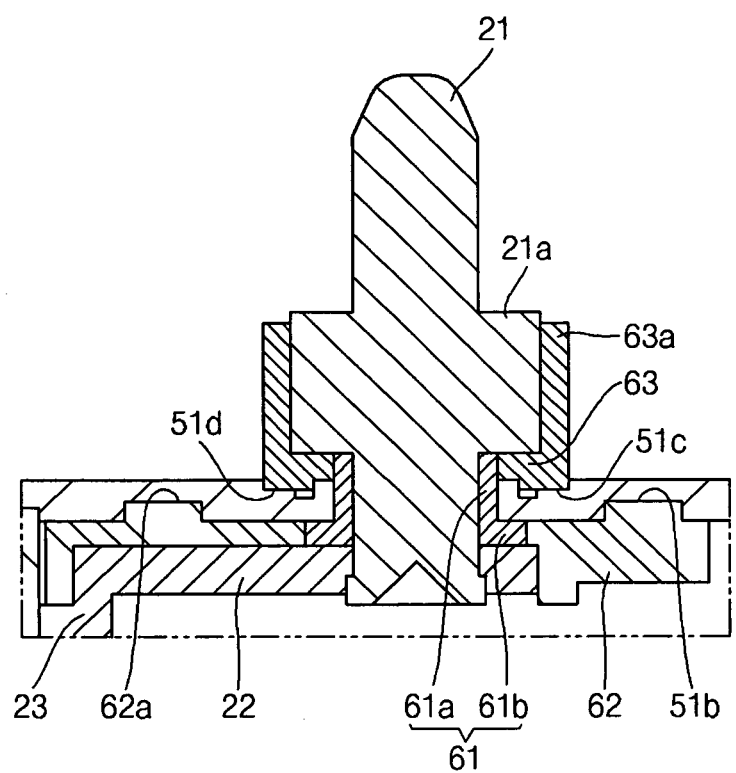
FIG. 4 illustrates an enlarged cross-sectional view of essential parts of a secondary battery according to another embodiment.

FIG. 4 illustrates an enlarged cross-sectional view of essential parts of a secondary battery according to another embodiment.

As illustrated in FIG. 4, the seal gasket 61 may include a body 61a surrounding the lower portion of the terminal body 21 and a flange 61b extending outwardly in a horizontal direction from a lower end of the body 61a. The flange 61b may be in close contact with a bottom surface of a cap plate 51. That is to say, the flange 61b may be positioned between the bottom surface of the cap plate 51 and the terminal connection part 22.

As described above, the flange 61b of the seal gasket 61 may make leaking of the electrolyte difficult, while further enhancing sealing efficiency between the seal gasket 61 and the cap plate 51. In particular, it is possible to prevent the electrolyte from infiltrating into the cap plate 51 through a gap between the flange 61b and the lower insulation member 62.

Figure 5:
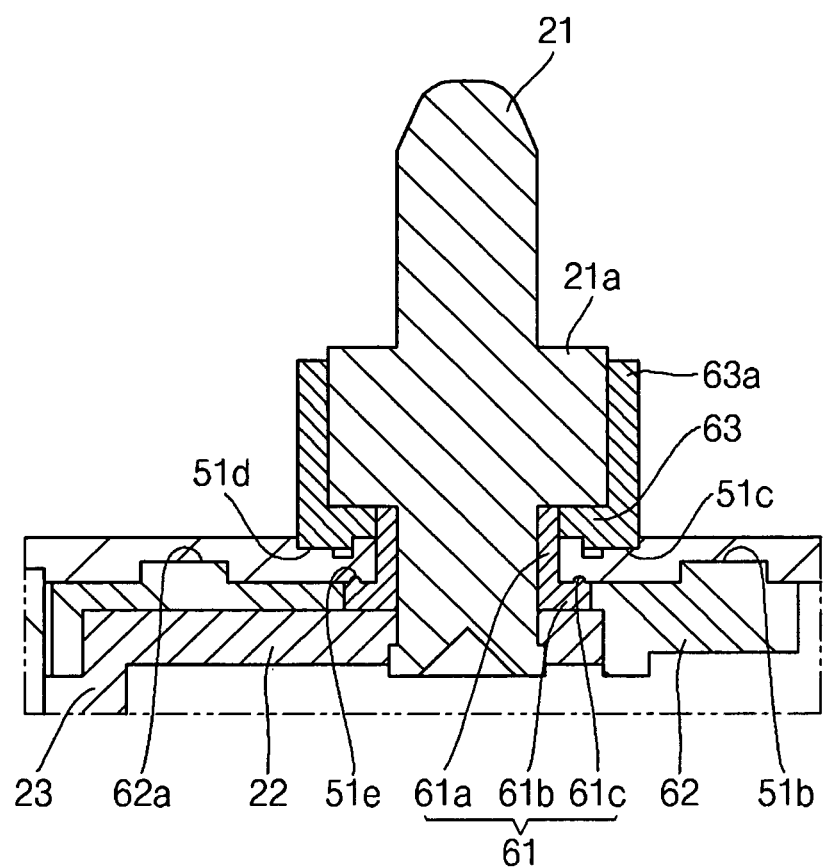
FIG. 5 illustrates an enlarged cross-sectional view of essential parts of a secondary battery according to yet another embodiment.

FIG. 5 illustrates an enlarged cross-sectional view of essential parts of a secondary battery according to yet another embodiment.

As illustrated in FIG. 5, the seal gasket 61 may include the body 61a surrounding the lower portion of the terminal body 21, the flange 61b extending outwardly in a horizontal direction from the lower end of the body 61a, and at least one protrusion 61c on a top surface of the flange 61b. The flange 61b may be in close contact with the bottom surface of a cap plate 51. The at least one protrusion 61c may be in close contact with the bottom surface of the cap plate 51.

The flange 61b may be positioned between the bottom surface of the cap plate 51 and a terminal connection part 22.

As described above, the at least one protrusion 61c on the flange 61b may further enhance the sealing efficiency between the flange 61b of the seal gasket 61 and the cap plate 51. In an implementation, a plurality of protrusions 61c may be provided. In addition, while FIG. 5 illustrates that the protrusion 61c is hemisphere-shaped, the protrusion 61c may have, e.g., a triangular shape, a rectangular shape, or equivalents thereof.

As illustrated in FIG. 5, a recess 51e may further be formed in the cap plate 51, specifically at an area corresponding to the protrusion 61c of the flange 61b. That is to say, the protrusion 61c of the flange 61b may be engaged with the recess 51e of the cap plate 51. In an implementation, the recess 51e may not be formed in the cap plate 51.

As described above, in the secondary battery according to the present embodiment, the sealing capability of the electrode terminal 20 may be further enhanced by additionally providing the protrusion 61c in the seal gasket 61.

Figure 6:
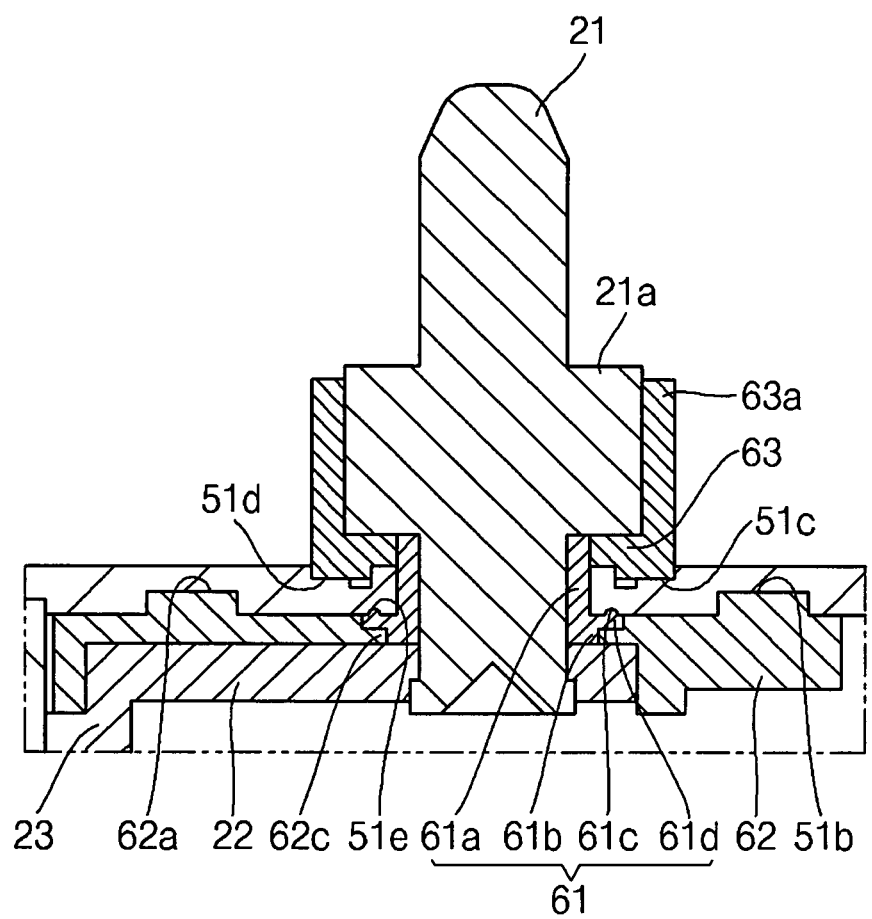
FIG. 6 illustrates an enlarged cross-sectional view of essential parts of a secondary battery according to still another embodiment.

FIG. 6 illustrates an enlarged cross-sectional view of essential parts of a secondary battery according to still another embodiment.

As illustrated in FIG. 6, the seal gasket 61 may include the body 61a surrounding the lower portion of the terminal body 21 and the flange 61b extending outwardly in a horizontal direction from the lower end of the body 61a. The flange 61b may be in close contact with the bottom surface of a cap plate 51.

The lower insulation member 62 may have a sill 62c at a portion thereof in close contact with a side surface of the flange 61b of the seal gasket 61. The flange 61b of the seal gasket 61 may have a seating part 61d extending therefrom and being securely placed in the sill 62c.

The flange 61b may be positioned between the bottom surface of the cap plate 51 and the terminal connection part 22. In an implementation, at least one protrusion 61c in close contact with the bottom surface of the cap plate 51 may be formed on the top surface of the seating part 61d of the flange 61b.

In the secondary battery according to the present embodiment, the sill 62 may be on the lower insulation member 62 and the seating part 61d securely placed on the sill 62c may be on the flange 61b, further enhancing the sealing efficiency between the flange 61b of the seal gasket 61 and the cap plate 51.

In an implementation, a plurality of protrusions 61c may be provided. In addition, while FIG. 6 illustrates that the protrusion 61c is hemisphere-shaped, the protrusion 61c may have, e.g., a triangular shape, a rectangular shape, or equivalents thereof.

As illustrated in FIG. 6, a recess 51e may further be formed in the cap plate 51, specifically at an area corresponding to the protrusion 61c of the flange 61b. That is to say, the protrusion 61c of the flange 61b may be engaged with the recess 51e of the cap plate 51. In an implementation, the recess 51e may not be formed in the cap plate 51.

According to an embodiment, formation of a gap between each of the electrode terminals and the cap plate may be prevented. Thus, electrolyte may not come into contact with the cap plate, which may result in a reduction of a breakdown voltage, causing electrical short-circuits between the electrode terminals and the cap plate. Accordingly, battery deterioration may be prevented and battery capacity may be maintained. In addition, the electrolyte may not leak outside the battery case through the gap between each of the electrode terminals and the cap plate, thereby preventing corrosion to various components outside the battery case. Further, external moisture may not infiltrate into the battery case through the gap.

As described above, in the secondary battery according to an embodiment, the protruding part may be provided at the electrode terminal, and the seal gasket may be inwardly formed at the lower end of the protruding part, so that the gap between the electrode terminal and the cap plate may be eliminated, thereby preventing the electrolyte from leaking out of the battery case.

In addition, according to an embodiment, since the lower flange of the seal gasket may be in close contact with the side surface of the lower insulation member while the protruding part of the electrode terminal is surrounded by the adhering part of the upper insulation member, the sealing efficiency may be enhanced, thereby preventing electrolyte from leaking out of and external moisture from infiltrating into the battery case.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims

What is claimed is:
1. A secondary battery, comprising:
   a case;
   an electrode assembly and electrolyte accommodated in the case;
   an electrode terminal electrically connected to the electrode assembly, the electrode terminal including a terminal body;
   a cap plate sealing the case, the terminal body penetrating through the cap plate;

a seal gasket surrounding a lower portion of the terminal body;

a separate lower insulation member in direct contact with a lower side surface of the seal gasket and a bottom surface of the cap plate;

an upper insulation member in direct contact with a top surface of the cap plate and an upper side surface of the seal gasket;

a terminal extension part riveted to a bottom portion of the terminal body and securely fixed thereto, the terminal extension part being in direct contact with a bottom surface of the lower insulation member; and a terminal welding part extending orthogonally from an end of the terminal extension part and being welded to an electrode non-coating portion of the electrode assembly, the electrode non-coating portion of the electrode assembly protruding toward one end of the cap plate, wherein:

the electrode terminal includes a laterally protruding part on a portion of the terminal body protruding outside the case, the protruding part overlying a portion of the cap plate, and the seal gasket is in direct contact with a lower surface of the protruding part, the lower surface of the protruding part facing the cap plate.

2. The secondary battery as claimed in claim 1, wherein the seal gasket has a hollow tube shaped body, the hollow tube shaped body surrounding a lower portion of the terminal body of the electrode terminal.

3. The secondary battery as claimed in claim 1, wherein the seal gasket includes an inwardly formed chamfer part at an upper end thereof.

4. The secondary battery as claimed in claim 1, wherein the seal gasket includes:

a body surrounding the lower portion of the terminal body of the electrode terminal, and a flange extending outwardly in a horizontal direction from a lower end of the body, the flange being in close contact with a bottom surface of the cap plate.

5. The secondary battery as claimed in claim 4, wherein the flange includes at least one protrusion on a top surface thereof, the at least one protrusion being in close contact with the bottom surface of the cap plate.

6. The secondary battery as claimed in claim 1, wherein the upper insulation member includes an adhering part on a surface thereof, the adhering part surrounding the protruding part of the electrode terminal.

7. The secondary battery as claimed in claim 1, wherein the cap plate includes a recess therein, the recess being engaged with the upper insulation member.

8. The secondary battery as claimed in claim 1, wherein the cap plate includes a recess therein, the recess being engaged with the lower insulation member.

9. A secondary battery, comprising:

a case;

an electrode assembly and electrolyte accommodated in the case;

an electrode terminal electrically connected to the electrode assembly, the electrode terminal including a terminal body;

a cap plate sealing the case, the terminal body penetrating through the cap plate;

a seal gasket, the seal gasket including a body surrounding a lower portion of the terminal body and a flange extending outwardly in a horizontal direction from a lower end of the body, the flange being in close contact with a bottom surface of the cap plate;

a lower insulation member in direct contact with a lower side surface of the seal gasket, the lower insulation member being in direct contact with the bottom surface of the cap plate;

an upper insulation member in direct contact with a top surface of the cap plate and an upper side surface of the seal gasket;

a terminal extension part riveted to a bottom portion of the terminal body and securely fixed thereto, the terminal extension part being in direct contact with a bottom surface of the lower insulation member; and a terminal welding part extending orthogonally from an end of the terminal extension part and being welded to an electrode non-coating portion of the electrode assembly, wherein:

the electrode terminal includes a laterally protruding part on a portion of the terminal body protruding outside the case, the protruding part overlying a portion of the cap plate, the seal gasket is in direct contact with a lower surface of the protruding part, the lower surface of the protruding part facing the cap plate the lower insulation member includes a lower portion extending closer to the lower portion of the terminal body than an upper portion of the lower insulation member, the lower portion of the lower insulation member being in close contact with a side surface of the flange of the seal gasket, and the flange of the seal gasket has a seating part extending from a side surface thereof, the seating part being securely placed on the lower portion of the lower insulation member extending closer to the lower portion of the terminal body than the upper portion of the lower insulation member.

10. The secondary battery as claimed in claim 9, wherein the seal gasket includes an inwardly formed chamfer part at an upper end thereof.

11. The secondary battery as claimed in claim 9, wherein at least one protrusion in close contact with the bottom surface of the cap plate is disposed on a top surface of the flange.

12. The secondary battery as claimed in claim 9, further comprising an adhering part on a surface of the upper insulation member, the adhering part surrounding the protruding part of the electrode terminal.

13. The secondary battery as claimed in claim 9, wherein the cap plate includes a recess therein, the recess being engaged with the upper insulation member.

14. The secondary battery as claimed in claim 9, wherein the cap plate includes a recess therein, the recess being engaged with the lower insulation member.

* * * * *